(12) United States Patent
Rudy et al.

(10) Patent No.: US 7,922,392 B2
(45) Date of Patent: Apr. 12, 2011

(54) HYDROSTATIC PROFILE RAIL GUIDE

(75) Inventors: Dietmar Rudy, Kleinbundenbach (DE); Wolfgang Bauer, Riegelsberg (DE)

(73) Assignee: Schaeffler KG, Herzogenaurach (DE)

( * ) Notice: Subject to any disclaimer, the term of this patent is extended or adjusted under 35 U.S.C. 154(b) by 473 days.

(21) Appl. No.: 12/063,634

(22) PCT Filed: Aug. 4, 2006

(86) PCT No.: PCT/EP2006/007724
§ 371 (c)(1),
(2), (4) Date: Mar. 5, 2008

(87) PCT Pub. No.: WO2007/019971
PCT Pub. Date: Feb. 22, 2007

(65) Prior Publication Data
US 2010/0177994 A1    Jul. 15, 2010

(30) Foreign Application Priority Data
Aug. 13, 2005  (DE) .......................... 10 2005 038 346

(51) Int. Cl.
*F16C 32/06*    (2006.01)
*F16C 29/02*    (2006.01)
(52) U.S. Cl. ................................ 384/12; 384/7; 384/42
(58) Field of Classification Search ................ 384/7, 12, 384/13, 15, 43–45, 49, 51, 42
See application file for complete search history.

(56) References Cited

U.S. PATENT DOCUMENTS

| | | | |
|---|---|---|---|
| 4,606,587 A | | 8/1986 | Thompson |
| 4,692,039 A | * | 9/1987 | Teramachi .................. 384/49 |
| 4,978,233 A | * | 12/1990 | Stotzel et al. ................ 384/12 |
| 4,988,215 A | * | 1/1991 | Osawa ........................ 384/44 |
| 5,193,914 A | * | 3/1993 | Tanaka ......................... 384/45 |
| 6,012,845 A | | 1/2000 | Lyon |
| 6,491,435 B1 | * | 12/2002 | Nishikawa et al. ........... 384/12 |

FOREIGN PATENT DOCUMENTS

| | | |
|---|---|---|
| CH | 459670 Y | 7/1968 |
| DE | 38 31 676 Y | 1/1990 |
| DE | 3917673 YA | 6/1990 |
| EP | 0361026 Y | 4/1990 |
| EP | 0798478 Y | 10/1997 |
| JP | 56049416 XA | 5/1981 |

* cited by examiner

*Primary Examiner* — Marcus Charles
(74) *Attorney, Agent, or Firm* — Lucas & Mercanti, LLP

(57) ABSTRACT

A hydrostatic profile of a rail guide with a guide carriage. Viewed in cross-section through the rail guide, there is an imaginary first straight line parallel to the mid-surface, an imaginary second straight line parallel to an upper bearing surfaces and a third imaginary straight line parallel to a lower bearing surface. An angle alpha is formed between the first and the second straight lines, and an angle gamma is formed between the first and the third straight lines. The angle alpha has values of 10° to 45 ° inclusive and the angle gamma has values of 20° to 55° inclusive.

13 Claims, 3 Drawing Sheets

HYDROSTATIC PROFILE RAIL GUIDE

Figure 1:
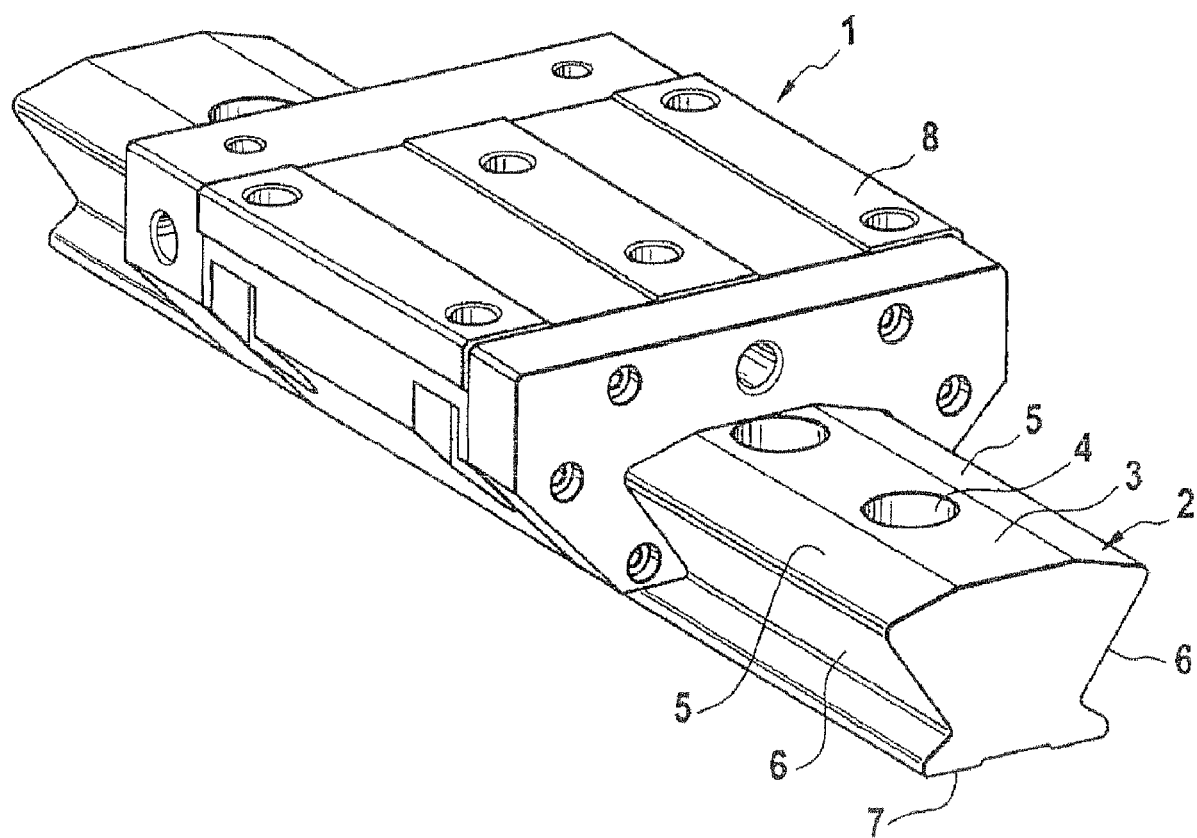

The present invention relates to a hydrostatic profiled-rail guide, having a guide carriage which can be hydrostatically mounted on a guide rail.

DE 38 31 676 C1, for example, discloses a hydrostatic profiled-rail guide in which a guide carriage is hydrostatically mounted on a guide rail. The guide rail has a central surface which extends along its longitudinal axis and two upper bearing surfaces which are arranged at both longitudinal sides of the central surface and which are arranged inclined with respect to the central surface. Below each upper bearing surface is a lower bearing surface which is inclined with respect to upper bearing surface and with respect to the central surface. As viewed in cross-section through the profiled-rail guide, a triangle is formed by an imaginary first straight line which is parallel to the central surface of the guide rail, an imaginary second straight line which is parallel to the upper bearing surface and an imaginary third straight line which is parallel to the lower bearing surface. In the triangle, an angle $\alpha$ is formed between the first and second straight lines. In the triangle, an angle $\gamma$ is also formed between the first and third straight lines.

Below the two upper and lower bearing surfaces, which are provided in the head region of the guide rail, two emergency running surfaces are provided in the base region of the guide rail at its two longitudinal sides. The emergency running surfaces, with the lower bearing surfaces of the head region, delimit an angle $\beta$ which is a maximum of 90°.

The guide carriage which is placed on the guide rail is likewise provided with upper and lower bearing surfaces, which interact with the upper and lower bearing surfaces of the guide rail. Formed between the respective bearing surfaces of the guide rail and of the guide carriage are pressure pockets in which a hydrostatic pressure can be built up. The hydrostatic pressure permits correct mounting of the guide carriage on the guide rail.

The possible applications of hydrostatic profiled-rail guides of the type can be restricted in that the limbs of the guide carriage can bend under an applied load. In this case, the pressure cushions built up in the pressure pockets can, under some circumstances, not be maintained, such that correct operation of the hydrostatic profiled-rail guide is not ensured. Such problems can, for example, be eliminated by enlarging the external proportions of the guide carriage, so that the limbs of the guide carriage become more rigid. Such variations are however inflicted with the disadvantage that an exchange of profiled-rail rolling guides for hydrostatic profiled-rail guides is not possible. The external geometry of profiled-rail guides is predefined according to DIN 645-1. Known hydrostatic profiled-rail guides cannot be used as a replacement for conventional profiled-rail rolling guides, since in order to ensure correct operation under comparable loading of hydrostatic profiled-rail guides, a modification in the external proportions is necessary, such that DIN 645-1 is not conformed to.

It is the object of the present invention to specify a hydrostatic profiled-rail guide according to the features of the preamble of claim 1 in which correct operation is ensured and which is suitable as a replacement for a profiled-rail rolling guide.

According to the invention, the object is achieved in that the above-mentioned angle $\alpha$ has values from 10° up to and including 45° and in that the above-mentioned angle $\gamma$ has values from 20° up to and including 55°. With the interplay according to the invention between two angle ranges $\alpha$ and $\gamma$, the guide rails and the guide carriages can be adapted to one another in such a way that, on the one hand, a sufficient degree of stiffness of the hydrostatic profiled-rail guide is ensured while, on the other hand, the outer proportions according to DIN 645-1 can be adhered to.

The angles $\alpha$ and $\gamma$ are implemented in a corresponding manner in the guide carriage. The guide carriage has two limbs which are connected to one another by means of a base. The guide carriage engages around the guide rail by means of the two limbs. The base has at one side, on its outer side, a mounting plane, for example for tools, and, on the other side, two upper bearing surfaces which are arranged so as to be inclined with respect to the mounting plane and which extend along the longitudinal axis of the profiled-rail guide. The upper bearing surfaces of the guide carriage are formed parallel to the upper bearing surfaces of the guide rail. Below the upper bearing surfaces of the guide carriage, in each case one lower bearing surface, which is inclined with respect to the upper bearing surface and with respect to the mounting plane, is provided on each limb of the guide carriage. As viewed in cross section through the profiled-rail guide, an imaginary first straight line which is parallel to the mounting plane, an imaginary second straight line which is parallel to the upper bearing surface and an imaginary third straight line which is parallel to the lower bearing surface from a triangle in which an angle $\alpha$ is formed between the first and second straight lines and in which an angle $\gamma$ is formed between the first and the third straight lines. The magnitudes of the angles $\alpha$ and $\gamma$ are accordingly formed so as to be the same in the guide carriage as in the guide rail.

In a refinement according to the invention, the width of the guide carriage can be in a ratio to the height of the hydrostatic profiled-rail guide. The quotient of the ratio can have values between 1.8 and 2.2 inclusive of the values. The width is defined by the width of the guide carriage and the height is defined by the spacing of the base surface of the guide rail to the upper side of the guide carriage. The upper side of the guide carriage can at the same time be the mounting plane of the guide carriage.

The angle ranges $\alpha$ and $\beta$ proposed according to the invention also permit quotients with correlating magnitudes—that is to say between 1.8 and 2.2 inclusive of the values—of the ratio of the width of the guide carriage to the width of the guide rail within the wrap-around of the guide carriage. The width of the guide carriage within the wrap-around is defined such that, within the region of the guide rail encompassed by the guide carriage, the greatest width of the guide rail is used as a basis for deteimining the quotient. The value range between 1.8 and 2.2 is particularly favorable in hydrostatic profiled-rail guides according to the invention in order to adhere to the values demanded according to DIN 645-1 while at the same time having a high degree of stiffness.

A further optimization of the stiffness is obtained in one refinement according to the invention in that a quotient of the ratio of the height of the hydrostatic profiled-rail guide to the effective height of the guide rail within the region enclosed by the guide carriage is likewise set between 1.8 and 2.2 inclusive of the values. The effective height of the guide rail is to be understood to mean that, here, the height which is encompassed by the guide carriage is used as a basis.

In other words, the effective height of the guide rail can be given by the difference of the magnitudes of the total height of the guide rail minus the base height of the guide rail, which is given by the spacing from the underside of the limbs of the guide carriage to the base surface of the guide rail.

It has already been stated further above that pressure pockets are formed between the corresponding upper and lower bearing surfaces of the guide carriage and of the guide rail.

According to one refinement of the invention, all the pressure pockets are provided with an adjustable throttle each for setting a hydrostatic pressure in the pressure pocket. The refinement according to the invention has the advantage that pressure fluctuations on account of elastic deformations of the guide carriage can be corrected by means of corrective adjustments at the throttles, such that for example, in the event of a slight pressure drop at a pressure pocket, a desired pressure increase can he set again by further opening the throttle.

As a result of the central surface of the guide rail not simultaneously being the bearing surface of the hydrostatic profiled-rail guide, it is provided in one refinement according to the invention to provide a plurality of passage openings along the central surface for the leadthrough of fastening screws. The guide rail can thereby be easily screwed to another machine part without it being necessary for the surface of the central surface to meet any particular requirements.

Figure 2:
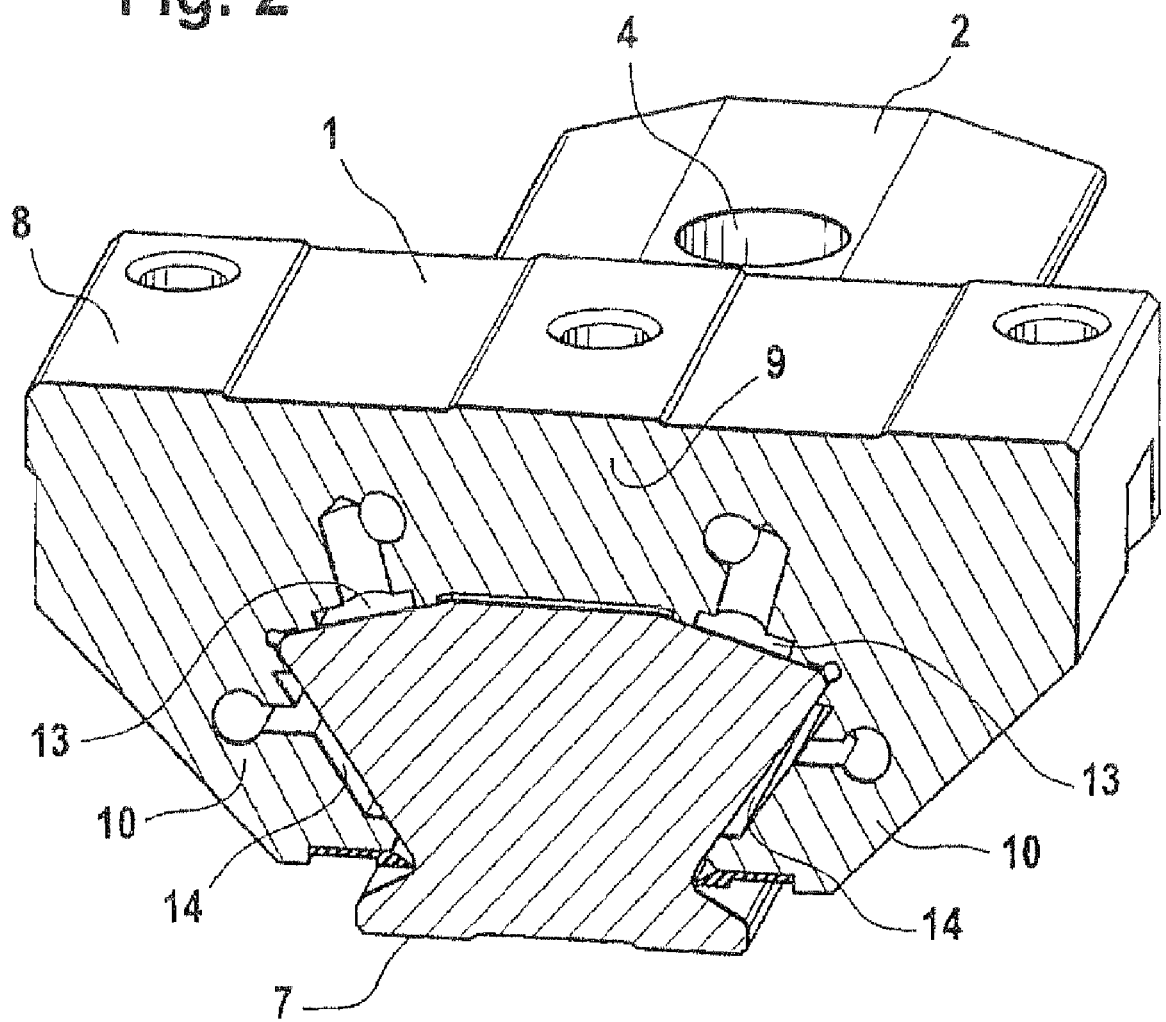
Figure 3:
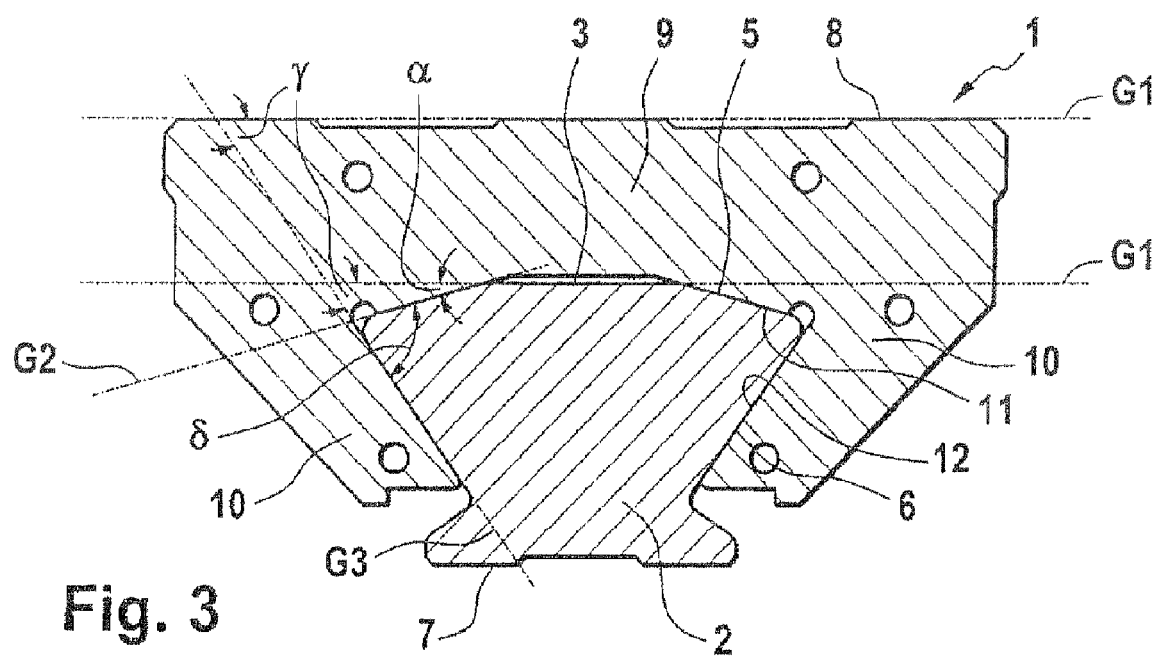
Figure 4:
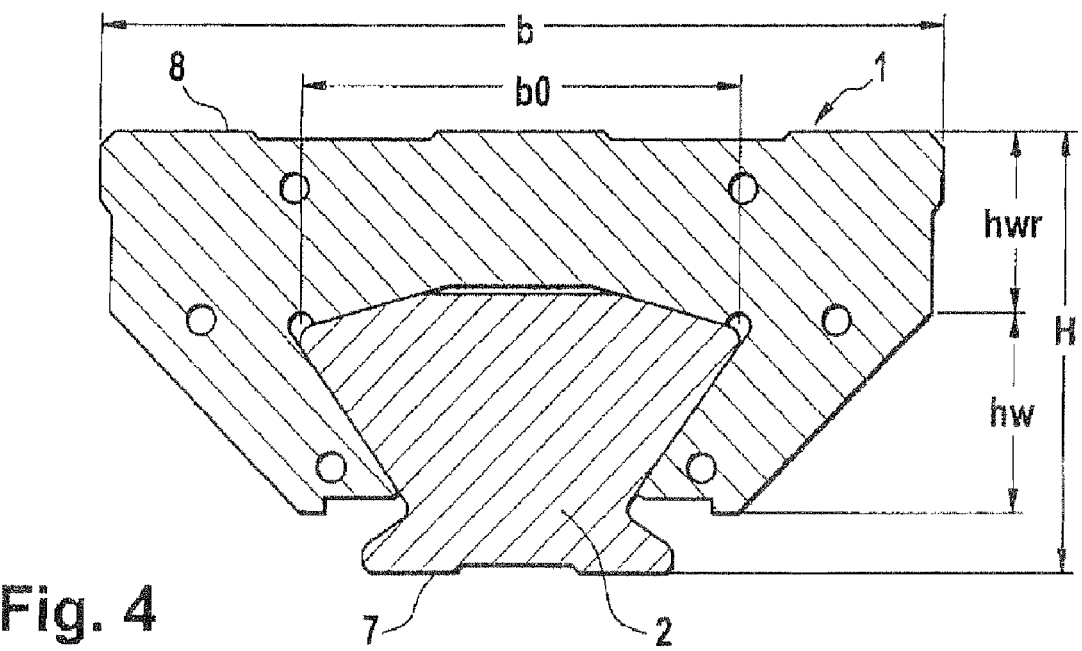

The invention is explained in more detail below on the basis of an exemplary embodiment depicted in a total of four figures, in which:

FIG. 1 shows a hydrostatic profiled-rail guide according to the invention in a perspective illustration, FIG. 2 shows a cross section through the hydrostatic profiled-rail guide from FIG. 1, FIG. 3 shows a further cross section through the profiled-rail guide according to the invention and FIG. 4 shows a further cross section through the profiled-rail guide according to the invention.

The profiled-rail guide, according to the invention, depicted in FIGS. 1 to 4, comprises a guide carriage 1 which is hydrostatically mounted on a guide rail 2. The guide rail 2 has a head section which faces toward the guide carriage 1 and a base section which faces toward a machine part (not depicted here) to which the guide rail 2 is fastened. At its head section, the guide rail 2 is provided along the longitudinal axis of the profiled-rail guide with a central surface 3. The guide rail 2 has a plurality of passage openings 4 arranged along the guide rail, through which passage openings 4 are provided fastening screws (not depicted here) for fastening the guide rail to the machine part mentioned further above. The passage openings 4 extend through the central surface 3 of the guide rail 2.

The guide rail 1 has at its head section two upper bearing surfaces 5 and two lower bearing surfaces 6. The upper bearing surfaces 5 are of planar design; they are inclined with respect to the central surface 3, with the one upper bearing surface 5 being arranged at one side of the central surface 3 and the other upper bearing surface 5 being arranged at the other longitudinal side of the central surface 3. The lower bearing surfaces 6 are arranged below the upper bearing surfaces 5. The lower bearing surfaces 6 are inclined both with respect to the central surface 3 and also with respect to the upper bearing surfaces 5.

FIG. 3 shows the hydrostatic profiled-rail guide according to the invention in Cross-section. It can be seen here that the central surface 3 is arranged parallel to a base surface 7 of the guide rail 2, with the base surface 7 being the support surface of the guide rail 2 for the machine part (not depicted here).

An imaginary first straight line G1 which is parallel to the central surface 3 and an imaginary second straight line G2 which is parallel to the upper bearing surface 5 and an imaginary third straight line G3 which is parallel to the lower bearing surface 6 form a triangle. In the triangle, an angle $\alpha$ is formed between the first and second straight lines G1 and G2. An angle $\gamma$ is formed between the first and the third straight lines G1, G3. According to the invention, the angle $\alpha$ is set to values from 10° up to and including 45° and the angle $\gamma$ is set to values from 20° up to and including 55°. At the point of intersection of the second and third straight lines G2, G3, an angle $\Delta$ is formed which can be determined purely by means of calculation from the two angles $\alpha$ and $\gamma$ mentioned in the introduction. On the one hand, with the angle ranges provided according to the invention, an optimum force distribution on the guide rail 2 and on the guide carriage 1 is generated. On the other hand, it has been found that, with the proposed angle ranges, the proportions of the guide carriage and guide rail can be set in such a way that the specifications of DIN 645-1 can be adhered to, with the load capacity of the hydrostatic profiled-rail guide according to the invention being comparable to that of a profiled-rail rolling guide of the same size.

It can also be seen from FIG. 3 that the straight line G1 is also arranged parallel to a mounting surface 8 of the guide carriage 1, and it is possible, for example, for tools, to be placed onto the mounting surface 8 and fastened to the guide carriage 1.

Further details regarding the guide carriage 1 can be gathered from FIG. 3 As illustrated in FIG. 3, guide carriage 1 has two limbs 10 which are integrally connected to one another by means of a base 9 and at which engage around the guide rail 2. The base 9 has at one side, at its side facing toward the guide rail 2, two upper bearing surfaces 11 which are arranged precisely opposite the two upper bearing surfaces 5 of the guide rail 2 and parallel to the upper bearing surfaces 5 of the guide rail 2. The upper bearing surfaces 11 are inclined in opposite directions with respect to the mounting surface 8 of the guide carriage 1. At the other side, the base 9 is has the already mentioned mounting surface 8.

Each limb 10 of the guide carriage 1 is also provided with a lower bearing surface 12 which is arranged precisely opposite, and parallel to, the lower bearing surface 6 of the guide rail 2. The two lower bearing surfaces 12 are inclined in opposite directions and are in each case arranged so as to be inclined both with respect to the upper bearing surface 11 and also with respect to the mounting surface 8.

The straight lines G2 and G3 already mentioned above with regard to the guide rail 2 are visibly arranged parallel to the upper bearing surfaces 11 and parallel to the lower bearing surfaces 12 of the guide carriage 1. Together with the imaginary straight line parallel to the mounting surface, the straight lines Gl, G2, G3 form a triangle which, in terms of its angle ratios, corresponds to the triangle which has already been described further above with regard to the guide rail 2.

If the guide rail 2 and the guide carriage 1 are formed with the angle ranges proposed according to the invention, optimum levels of stiffness are obtained if the width of the guide carriage 1 and the total installation height of the hydrostatic profiled-rail guide are set such that a quotient of the ratio of the width of the guide carriage to the installation height of the hydrostatic profiled-rail guide is set to values between 1.8 and 2.2 inclusive of the values.

FIG. 4 shows the width b of the guide carriage 1 and the total installation height H of the profiled-rail guide. The height H is defined by the spacing between the mounting surface 8 of the guide carriage 1 and the base surface 7 of the guide rail 2.

In the hydrostatic profiled-rail guide, according to the invention, a width ratio of the guide carriage 1 in relation to the width of the guide rail 2 within the head region is advantageously likewise set such that the quotient can have values between 1.8 and 2.2 inclusive of the values. The width b0 is measured where the lower and upper bearing surfaces 5, 6 meet approximately at a common center.

The total height H of the profiled-rail guide, according to the invention, is set in a ratio to the effective height of the guide rail 2 such that the quotient of the ratio can roach values between 1.8 and 2.2 inclusive of the values. The effective height hw is given here by the difference of the total height of the guide rail minus the free base height of the guide rail 2, which is given by the spacing from the underside of the limb 10 to the base surface 7 of the guide rail 2.

In the case of the angle ranges, according to the invention, specified here, uniform ranges of quotients are proposed for all the ratios specified here. With the ranges for the quotients and with the angle ranges according to the invention, the profiled-rail guide according to the invention can he easily adapted to the standard values for profiled-rail rolling guides of DIN 645-1, with the profiled-rail guides according to the invention proposed here permitting the same loading as the comparable profiled-rail rolling guides. This means that the hydrostatic profiled-rail guides according to the invention can be easily provided as a replacement for profiled-rail rolling guides.

DIN 645-1 provides standardized type series 15, 20, 25, 30, 35, 45, 55, 65. In the smaller type series from 15 to approximately 30, hydrostatic profiled-rail guides according to the invention are$_a$ in particular, provided in which the quotient specified further above for the different width and height ratios is specified between 1.8 and 1.9. For the larger type series up to 65, the quotient should reach values between 2.0 and 2.2. It has surprisingly been found that the hydrostatic profiled-rail guide according to the invention is of optimum design when the quotients specified here are set such that, in terms of magnitude, they are as large as the respective ratio B/H of the corresponding size or type series of DIN 645-1. If, for example, a hydrostatic profiled-rail guide according to the invention is to be designed which is provided as a replacement for the type series of size 45 according to DIN 645-1, the width and height ratios specified according to the invention are set such that the quotient assumes the value 2. The value 2 corresponds precisely to the ratio provided according to DIN 645-1, which is Oven by the ratio of the width A of the guide carriage to the total height of the profiled-rail rolling guide (120/60).

FIG. 2 shows a cross-section through the profiled-rail guide according to the invention, with the section here showing pressure pockets 13, 14 which are formed between the upper and lower bearing surfaces 5, 6, 11, 12 of the guide carriage 1 and of the guide rail 2. Each of said four pressure pockets 13, 14 has a throttle (not shown). A control device can be connected to the hydrostatic profiled-rail guide, which control device ensures that the pressure in each pressure pocket 13, 14 can be adjusted separately. The separate adjustment is advantageous in particular when, on account of an asymmetrical or excessive loading of the hydrostatic profiled-rail guide, there is slight tilting between the guide rail 2 and the guide carriage 1. In the tilted position, the pressure conditions in the pressure pockets 13, 14 change. For example, on account of an increase in the spacing between the respective bearing surfaces of the guide rail and the guide carriage, oil can flow out of the pressure pocket too quickly, such that the pressure collapses. In that situation, the throttle provided for the pressure pocket can be opened until the oil pressure in the pressure pocket has again reached a value such that correct functioning of the profiled-rail guide is ensured.

LIST OF REFERENCE SYMBOLS

1 Guide carriage
2 Guide rail
3 Central surface
4 Passage opening
5 Upper bearing surface
6 Lower bearing surface
7 Base surface
8 Mounting surface
9 Base
10 Limb
11 Upper bearing surface
12 Lower bearing surface
13 Pressure pocket
14 Pressure pocket

The invention claimed is:

1. A hydrostatic profiled-rail guide, comprising:
a guide carriage which is hydrostatically mountable on a guide rail,
the guide rail having a central surface extending along a longitudinal axis of the profiled-rail guide, two upper bearing surfaces which are arranged at both longitudinal sides of the central surface and which are arranged inclined with respect to the central surface, lower bearing surfaces, which are inclined with respect to the upper bearing surface and with respect to the central surface, being provided below each of the upper bearing surfaces, and a base surface which is parallel to the central surface,
wherein an imaginary first straight line which is parallel to the central surface, an imaginary second straight line which is parallel to the upper bearing surface and an imaginary third straight line which is parallel to the lower bearing surface form, as viewed in cross-section through the profiled-rail guide, a triangle in which an angle alpha is formed between the first and second straight lines and in which an angle gamma is formed between the first and the third straight lines,
wherein the angle alpha has a value from 10° up to and including 45° and in that the angle gamma has a value from 20° up to and including 55°.

2. The hydrostatic profiled-rail guide as claimed in claim 1, wherein the guide carriage is placed onto the guide rail, and a quotient of a ratio of a width to a height of the hydrostatic profiled-rail guide being set to between 1.8 and 2.2 inclusive of said values, with the width being defined by the width of the guide carriage, and with the height being defined by a spacing from the base surface of the guide rail to a mounting surface of the guide carriage.

3. The hydrostatic profiled-rail guide as claimed in claim 2, wherein the upper and the lower bearing surfaces of the guide carriage interact with upper and lower bearing surfaces of the guide rail, and pressure pockets are provided on the upper and on the lower bearing surfaces of the guide carriage in order to build up a hydrostatic pressure between the upper and the lower bearing surfaces, which are assigned to one another, of the guide carriage and of the guide rail.

4. The hydrostatic profiled-rail guide as claimed in claim 3, wherein all the pressure pockets are provided with one adjustable throttle each for setting a hydrostatic pressure in the pressure pocket.

5. The hydrostatic profiled-rail guide as claimed in claim 1, wherein a quotient of a ratio of a width of the guide carriage to a width of the guide rail within a wrap-around of the guide carriage is set between 1.8 and 2.2 inclusive of said values.

6. The hydrostatic profiled-rail guide as claimed in claim 1, wherein a quotient of a ratio of a height of the hydrostatic profiled-rail guide to an effective height of the guide rail within a region enclosed by the guide carriage is set between 1.8 and 2.2.

7. The hydrostatic profiled-rail guide as claimed in claim 6, wherein the effective height of the guide rail is given by a difference of a total height of the guide rail minus a base height of the guide rail, which is given by a spacing from a underside of limbs of the guide carriage to the base surface of the guide rail.

8. The hydrostatic profiled-rail guide as claimed in claim 1, wherein the central surface of the guide rail has a plurality of passage openings, which are arranged along the guide rail.

9. A hydrostatic profiled-rail guide, comprising:
a guide carriage having a base and two limbs extending from the base which are each angled inward towards a guide rail, engageable around the guide rail and hydrostatically mountable on the guide rail,
the base having, on one side, a mounting surface and, on the other side, two upper bearing surfaces which are inclined with respect to the mounting surface and which extend along a longitudinal axis of the profiled-rail guide, and a lower bearing surface, which is arranged so as to be inclined with respect to the upper bearing surface and with respect to the mounting surface, being provided below the upper bearing surfaces,
wherein an imaginary first straight line which is parallel to the mounting surface, an imaginary second straight line which is parallel to the upper bearing surface and an imaginary third straight line which is parallel to the lower bearing surface forming, as viewed in cross section through the profiled-rail guide, a triangle in which an angle alpha is formed between the first and second straight lines and in which an angle gamma is formed between the first and the third straight lines ,
wherein the angle alpha has values from 10° up to and including 45° and in that the angle gamma has values from 20° up to and including 55° .

10. The hydrostatic profiled-rail guide as claimed in claim 9, wherein the guide carriage further comprises relief cutouts at an intersection between the upper bearing surfaces and the lower bearing surfaces.

11. The hydrostatic profiled-rail guide as claimed in claim 8, wherein the guide carriage further comprises a plurality of through-holes extending horizontally along the guide carriage.

12. The hydrostatic profiled-rail guide as claimed in claim 11, wherein bores extend outwardly from the pressure pockets.

13. The hydrostatic profiled-rail guide as claimed in claim 12, wherein the through-holes partially penetrate the bores that extend outwardly from the pressure pockets.

* * * * *